June 20, 1972 F. G. MERSER Re. 27,391

CONNECTOR FOR HOLDING ARTICLES TOGETHER

Original Filed Nov. 21, 1967

Inventor
Francis G. Merser
by Roberts, Cushman & Grover
Attys

United States Patent Office

Re. 27,391
Reissued June 20, 1972

27,391
CONNECTOR FOR HOLDING ARTICLES TOGETHER

Francis G. Merser, Framingham, Mass., assignor to Dennison Manufacturing Co., Framingham, Mass.

Original No. 3,462,802, dated Aug. 26, 1969, Ser. No. 721,365, Apr. 15, 1968, which is a continuation of Ser. No. 684,685, Nov. 21, 1967. Application for reissue Oct. 12, 1970, Ser. No. 80,259

Int. Cl. A44b *9/00;* B65d *63/00*

U.S. Cl. 24—16 PB 5 Claims

Matter enclosed in heavy brackets [ ] appears in the original patent but forms no part of this reissue specification; matter printed in italics indicates the additions made by reissue.

ABSTRACT OF THE DISCLOSURE

A connector comprising a filament having a socket and a series of heads distributed along the filament to snap through the socket to form loops of different sizes.

This application is a continuation of application Ser. No. 684,685, filed Nov. 21, 1967 and now Patent No. 3,422,499.

Objects of the invention are to provide a device for joining articles together, which is neat and attractive in appearance, and which can connect articles or groups of articles of different sizes.

According to this invention the connector comprises a filament, a socket on the filament, and a series of heads distributed along the filaments to snap through the socket to form loops of different sizes, each head being slightly larger than the socket and the socket being resilient so that insertion of a head produces expansion of the socket and after the head has been inserted the socket snaps in behind the head to restrain withdrawal of the head from the socket, the spacing between the heads being substantially equal to the depth of the socket so that, when the socket snaps behind a head, the next succeeding head seats in the mouth of the socket to hold the heads in place. Preferably the socket is circular and each head is conical and the socket is slotted to facilitate expansion. In the preferred embodiment the end of the filament for insertion through the socket has an elongate enlargement to facilitate insertion.

For the purpose of illustration a typical embodiment of the invention is shown in the accompanying drawings in which FIG. 1 is a top view;

Figure 1:
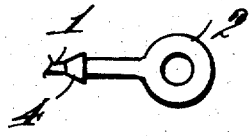
Figure 2:
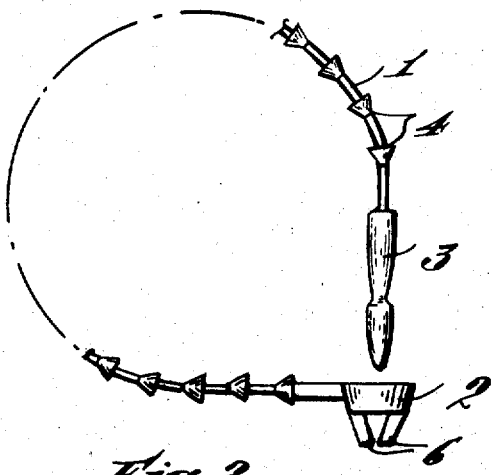
FIG. 2 is a side view.
Figure 3:
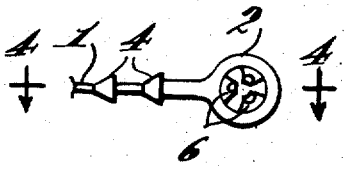
FIG. 3 is a bottom view.
Figure 4:
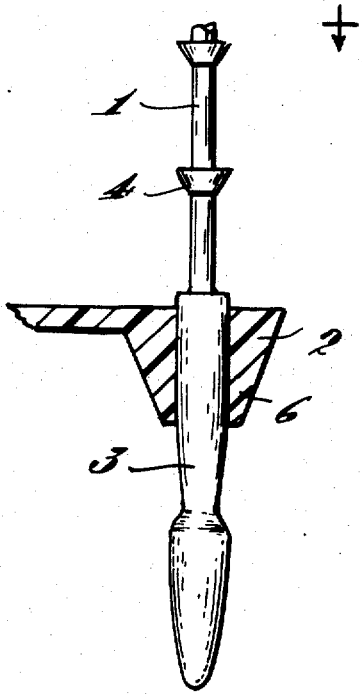
FIG. 4 is a section on line 4—4 of FIG. 3 showing the enlarged end of the filament partly inserted through the socket.
Figure 5:
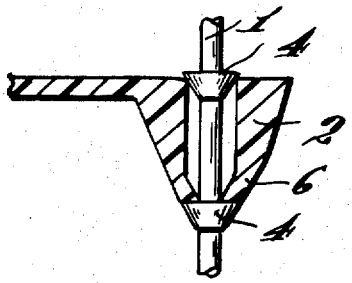
FIG. 5 is a similar view showing one head snapped through the socket and the next succeeding head seated in the mouth of the socket.

The particular embodiment of the invention chosen for the purpose of illustration comprises a filament 1, a socket 2 on one end of the filament, an elongate enlargement 3 on the other end of the filament to facilitate insertion of the filament through the socket as shown in FIG. 4 and a series of heads distributed along the filament. As disclosed in my pending application Ser. No. 633,782, filed Apr. 26, 1967, the connector is molded in a single integral piece of nylon or other thermoplastic material which is resilient and the socket is slotted to form prongs 6 to snap in behind the heads 4 as shown in FIG. 5. Preferably the socket is circular as shown in FIGS. 1 and 3, and the heads are conical as shown in FIGS. 2, 4 and 5. The heads are slightly larger than the socket so that they seat on the mouth of the socket as shown in FIG. 5 and must be forced through the socket, the heads contracting slightly and the socket expanding slightly due to their resiliency.

A salient feature of the invention consists in that the spacing between the heads is substantially equal to the depth of the socket so that, when the socket snaps behind a head, the next succeeding head seats in the mouth of the socket as shown in FIG. 5 to hold the filament against back-and-forth movement.

I claim:

1. A connector comprising a filament, a socket on the filament, *the axial depth of said socket being many times greater than the thickness of said filament, said socket being axially resilient,* and a series of heads distributed along the filament to snap through the socket to form loops of different sizes, each head being slightly larger than the socket and the socket being radially resilient so that insertion of a head produces expansion of the socket and after the head has been inserted the socket snaps in behind the head to restrain withdrawal of the head from the socket, the spacing between the heads being [substantially equal to] *no greater than* the depth of the socket so that, when the socket snaps behind a head, the next succeeding head *simultaneously* seats in the mouth of the socket to hold the heads in place, *said socket extending between surfaces exposed at opposite sides of said device, said axial depth of said socket being the distance between the mouth of said socket, located on one of said surfaces, and the portion of said socket which snaps in behind a head, located on the other of said surfaces.*

2. A connector according to claim 1 wherein the socket is slotted to facilitate expansion.

3. A connector according to claim 1 wherein the socket is circular and each head is conical.

4. A connector according to claim 1 wherein the end of the filament opposite the socket has an elongate enlargement to facilitate insertion through the socket.

*5. The device of claim 1, in which said socket projects from said filament, said other end of said opening being at the end of said socket which projects from said filament and said one end of said opening being substantially at the same level as the corresponding surface of said filament.*

References Cited

The following references, cited by the Examiner, are of record in the patented file of this patent or the original patent.

UNITED STATES PATENTS

| | | | |
|---|---|---|---|
| 876,402 | 1/1908 | Schacht | 24—16 PB UX |
| 3,265,426 | 8/1966 | Brooks et al. | 292—307 |
| 3,290,080 | 12/1966 | Dawson | 292—322 |

FOREIGN PATENTS

| | | | |
|---|---|---|---|
| 1,264,553 | 5/1961 | France | 24—16 PB |
| 1,288,128 | 2/1962 | France | 24—16 PB |
| 1,332,239 | 6/1963 | France | 24—16 PB |
| 917,217 | 8/1954 | Germany | 24—30.5 PB |

DONALD A. GRIFFIN, Primary Examiner

U.S. Cl. X.R.

24—150 FP